United States Patent Office 3,127,388
Patented Mar. 31, 1964

3,127,388
PEROXIDE TREATMENT IN ALKALINE AND ENZYMIC HYDROLYSIS OF SEED PRESS-CAKE
Robert A. Johnson, San Jose, and Patricia T. Anderson, San Mateo, Calif., assignors to Food Techniques, Inc., San Jose, Calif., a corporation of California
No Drawing. Filed Dec. 8, 1960, Ser. No. 74,472
4 Claims. (Cl. 260—123.5)

This invention relates to a process for isolating protein. More particularly, it involves an improved method for isolating protein from vegetable meal or press cakes.

Seeds such as those of cotton, sesame, soy, rape, wheat bran, coconut and safflower are frequently treated to remove the vegetable oil carried by the seeds. The by-product of this operation is a meal or press cake which is extremely high in protein content. The protein however, is associated with cellular and non-nutritive constituents, many of which are either unpleasant to taste or allergenic to humans thus rendering the press cake unfit for human consumption. Thus, the majority of this high protein meal has been employed for animal feed where the impurities can be tolerated.

Methods have been developed in the past to remove the protein from the parts of the press cake which were not fit for human consumption. Generally, these methods employ an alkaline hydrolysis procedure so that the protein in the press cake is hydrolyzed and thereby solubilized. The remaining insoluble portion of the press cake could then be filtered. The protein in solution could then be precipitated and recovered to be used for any desired purpose.

The most serious handicap attendant such a straight alkaline hydrolysis method is the extremely low yield thereby obtained. In order to improve the yield further refinements of the process have been developed. The most important was in the use of proteolytic enzymes. The proteolytic enzymes aid in the hydrolysis of the available proteins in the meal, converting them to their more soluble form so as to free them from the cellular structure of the press cake. This results in more of the protein being solubilized and an ultimately considerably greater yield than with hydrolysis without benefit of proteolytic enzymes.

While the enzyme and alkaline hydrolysis method results in a generally acceptable yield of protein, there remained room for improvement. Thus, the yield of protein from vegetable meal or press cakes did not approach a 100% recovery by any means. In addition, both the alkaline hydrolysis method and the alkaline hydrolysis proteolytic enzyme method possess another serious disadvantage. In either process, after the hydrolysis has been completed and the insoluble portions of the meal separated, the protein is recovered from the protein solution by precipitation. This recovery step has been extremely difficult if not entirely impractical due to the fact that the precipitated curd is so fine and flocculant that it cannot be centrifuged out to any marked degree.

It is therefore a principal object of the present invention to provide an improved process for recovering protein from vegetable meals. It is a further object of the present invention to provide a process for recovering protein from vegetable meal in higher yields than has been heretofore possible. Another important object is to provide a process for recovering protein from vegetable meal by a hydrolysis process in which the protein is solubilized and may then be recovered by precipitation from the solution as a solid or curd in which the curd density and physical characteristics are increased and improved to a point where the precipitated curd is easily separated from the solution. Other objects, features, and advantages will become apparent as the following detailed disclosure progresses.

This application is a continuation-in-part of co-pending application, Serial No. 750,785, filed July 24, 1958, now abandoned.

The present improved process is applicable generally to the class of products herein termed vegetable meals. This refers generally to the product produced when seeds of various vegetables are pressed to remove the vegetable oil. The remaining by-product of this operation is the vegetable meal or press cake referred to throughout this application and claims. In particular, preferred vegetable meals are those derived from the seeds of cotton, sesame, soy, rape, wheat brain, safflower and coconut, although seeds of other vegetables may be used.

Generally, the improvement provided by the present invention is applicable to the process that has been used in the prior art for solubilizing protein and removing it from the vegetable meal. This prior art process generally consists of forming an aqueous slurry between the vegetable meal or press cake and water. This slurry may be prepared so as to contain preferably about 10% to 20% solids. In any event the liquidity of the slurry should be such as to render it flowable for liquid transport without the necessity of additional liquid. It is also to be observed that there should be sufficient liquid in contact with the meal or press cake so that all surfaces of the meal are in liquid contact during agitation and subsequent treatment.

An alkali such as potassium or sodium hydroxide is added to the slurry to impart an alkaline condition to the slurry. Upon heating for a sufficient length of time at temperatures up to about 200° F. the protein is solubilized and may be separated from the curd by any convenient method such as filtration or centrifuging. The protein may then be recovered from the aqueous solution, although with great difficulty owing to the consistency of the curd formed, by acidifying the solution and causing its precipitation.

The yield obtained in the foregoing general method has been greatly improved by the use of proteolytic enzymes as previously described. This method follows the same general steps as in the straight alkaline hydrolysis method. However, prior to the addition of the enzyme the slurry should be adjusted in temperature and pH to a point which will afford an environment for optimum enzyme activity for the particular enzyme and protein substrate in the slurry. The exact temperature range and hydrogen ion concentration range will vary in accordance with the particular enzyme that is employed. As is well understood in the art, each enzyme has preferred or optimum levels of enzyme activity both with respect to temperature and hydrogen ion concentration and in relation to the protein substrate.

Generally, the enzymes which are preferably employed are used in a solution in which the pH range is from about 4 through 9 with points of greatest activity somewhere in between these two extremes depending upon the particular enzyme. Examples of suitable enzymes include bromelin, papain, ficin, and the like. Generally, these enzymes are active over a temperature range of from about 70° to about 150° F. Bromelin, for example, has points of greatest activity at pH 4.5, 5.5, 7.0 and 8.5. The bromelin is active at temperatures from about 60° to 140° F. in neutral solutions, and 150° F. may be used with little inactivitation of the enzyme.

Other proteolytic enzymes or mixtures of enzymes may be used with suitable adjustment of pH and temperature to obtain the range of optimum activity. It has been found that the proteolytic enzymes obtained from vegetable materials are preferable for this process due to the possible colors and odors which may result from the use of animal derived enzymes.

The enzyme should be added to the slurry in sufficient quantity to obtain enzyme reactivity with the greatest portion of the protein in the slurry. It has been found for example, that where bromelin is used, a concentration of approximately .05 to 2% bromelin with respect to the available protein within the slurry is sufficient to obtain enzyme activity with maximum protein recovery. Determination of the amount of enzyme required is made prior to commencing the process by measuring the protein content of the cake.

The slurry is then incubated preferably while agitating under the requisite optimum temperature and pH range for a time period sufficient to allow substantially all of the protein to be acted upon by the enzyme. When bromelin is used for example, the incubation is carried on for about two hours within the range of 60° to 100° F. The incubation period allows full reaction of the enzyme with the protein.

At the end of the incubation period the protein is brought into solution by adjusting the slurry to a higher pH. To do this, a base such as an alkali hydroxide is added to the slurry. When the protein goes into solution, neutralization of the alkali occurs making it desirable to add sufficient alkali so that the hydrogen ion concentration of the resultant solution will be at about pH 9–12.

The alkaline slurry is heated and agitated to assist the solubilization of the protein. Temperatures in the range of about 140° to about 180° F. for approximately thirty minutes are generally sufficient to obtain optimum or maximum solubilization. Higher temperatures may be used but denaturation of the protein may result causing a decrease in the final amount of protein recovered by the process. Generally then, the temperatures should not exceed about 200° F. The slurry is then filtered or centrifuged to separate the solids not in solution or suspension from the protein filtrate.

As in the straight alkaline hydrolysis method, the solubilized protein is recovered from the solution by acidifying the solution with an acid such as a strong inorganic acid like hydrochloric acid. The protein will precipitate and may be removed by any convenient method such as filtration or centrifuging. Again, great difficulty is encountered because of the curd consistency.

The present invention improves upon the yield, and the ease of handling the curd produced by both of the foregoing methods of recovering protein from vegetable meal by hydrolysis. The improvement provided by the present invention comprises treating the vegetable meal with hydrogen peroxide.

In addition to providing a higher yield of protein in solution and to producing a dense curd which is easily centrifuged after the precipitation, the present improvement has yet another distinct and important advantage. The resulting protein product will be of a desirable light color. This is in marked contrast with the protein recovered by the prior art processes in which the protein product was of a dark and generally undesirable appearance.

In practicing the present improved process the vegetable meal is treated with hydrogen peroxide. In all other respects the process generally follows the prior art alkaline hydrolysis or alkaline hydrolysis with enzyme methods. Preferably, the hydrogen peroxide is added to the vegetable meal after the meal has been slurried. Thus, it will be present when the initial heating phase is conducted in alkaline solution. The peroxide may however, be added later in the procedure if desired with satisfactory results. In the preferred procedure the initial heating and hydrolysis is continued in the presence of hydrogen peroxide until there is indication that the peroxide action has been completed. This indication may generally be found in the fact that foaming will cease when the peroxide action has ceased.

The amount of hydrogen peroxide to be added may be varied over a considerable range depending on the particular vegetable meal under consideration and whether or not the peroxide is to be used in conjunction with an enzyme treatment. It has been found that excellent results will be obtained if hydrogen peroxide in the quantity of about .01 mole to about .4 mole for each 100 grams of vegetable seed meal to be processed is employed. It should be understood however, that these quantities may be varied by making appropriate changes in the process. For example, if the peroxide is added later in the process after the first concentration of protein has been made by removing the cellular material and the protein concentration thereby increased, lesser quantities of peroxide may be used. Greater quantities of peroxide may be used without substantial deleterious effect but no advantage will in general be gained.

The foregoing figures are also based on a seed meal having the usual or most prevalent concentrations of protein found in seed meal of about 42–52%. Seed meals which do not fall in the foregoing category will require more or less peroxide depending on whether they are higher or lower in protein concentration respectively. As used throughout this specification and claims however, the unit 100 grams of seed meal should be taken to mean seed meal which contains between about 42% and 52% protein.

Details of the present improved process will be best illustrated and understood by reference to the following examples. These examples will also demonstrate the various improvements in yield, filterability, and color of the final product. It will be understood and appreciated by those skilled in the art that many changes in details of the following examples may be made without departing from the scope of the present invention, and that these examples are offered for illustrative purposes only.

Examples 1 and 2 illustrate the superior results obtained when the improvement is used on a straight hydrolysis process with no enzyme added.

EXAMPLE 1

*Protein Recovery by Straight Alkaline Hydrolysis*

Screw press cotton seed meal having a protein content of 50.3% and a moisture content of 5.32% was employed. The meal was milled and passed through a 42 mesh screen to insure uniformity. A 20 gram sample of meal was slurried in 180 milliliters of distilled water. 2.4 milliliters of 15% by weight sodium hydroxide solution was added to the slurry and the slurry was heated to 160° F. and held at this temperature for 30 minutes with intermittent agitation. The slurry was then centrifuged to separate the protein containing liquid from the insoluble material. The insoluble material was then washed by slurrying it with 120 milliliters of hot, alkaline water (1 milliliter of 19% sodium hydroxide per liter of distilled water). The washed slurry was held at 160° F. for 15 minutes with occasional stirring and then centrifuged as before.

The supernatant wash was added to the first separation liquid and the remaining insoluble material dried. The protein containing liquid had a total volume of 244 milliliters and was analyzed to establish a content of 3.08% total solids and 1.34% protein. The pH of the liquid was 9.9. 11.40 grams of dried insoluble material was recovered.

Calculating from the above data, the foregoing process provided 39.6% of the solids and 32.6% of the available protein as an extract from the original cotton seed meal. To recover pure dry protein, 231 milliliters of the above alkaline protein containing liquid was heated to 100° F. and the protein precipitated from the solution by the addition of 3.1% hydrochloric acid by lowering the pH to about 4.5. The protein precipitated out in a very fine curd which could not be centrifuged to any marked degree at 2400 r.p.m. Only 3.8% of the protein was removed by centrifuging. This was due in large measure to the fine curd size of the precipitate.

EXAMPLE 2

*Recovery of Protein From Vegetable Meal by Alkaline Hydrolysis-Peroxide Treatment*

A 20 gram sample identical to the one in Example 1 was slurried in 180 milliliters of distilled water. 1.6 milliliters of 19% by weight sodium hydroxide solution was added to the slurry and heated to 190° F. Immediately, 3 milliliters of 130 volume hydrogen peroxide was added and the slurry held at 190° F. for 35 minutes. At that time the foaming had stopped, indicating that the peroxide action was complete.

The slurry was then cooled to 160° F. and 3 milliliters of 15% by weight of sodium hydroxide was added to adjust the pH to about 9.5. The slurry was held at 160° F. for 30 minutes with intermittent agitation and was then centrifuged to separate the protein containing liquid from the insoluble material. The insoluble material was washed by slurrying it with 120 milliliters of hot alkaline water (1 milliliter of 19% sodium hydroxide per liter of distilled water). The washed slurry was held at 160° F. for 15 minutes with occasional stirring and then centrifuged as before.

The supernatant was added to the first separation liquid and the remaining insoluble material was dried for 48 hours at 160° F. The protein containing liquid had a total volume of 257 milliliters and on analysis showed the presence of 5.03% total solids and 2.86% protein. The recovery of the dried insoluble material was 6.12 grams.

Calculations based on the above data showed that 68.3% of the solids and 73.2% of the available protein was extracted from the cotton seed meal by this process. This is an increase of 40.6% in protein yield over the straight hydrolysis process of Example 1.

244 milliliters of the alkaline protein containing liquid were heated to 100° F. and the protein precipitated from the solution by the addition of 3.1% hydrochloric acid until the pH reached 3.8. The resultant mixture was then centrifuged at 2400 r.p.m. and the precipitated protein washed twice, each time with 50 milliliter portions of acidified water (pH 4.5) and recentrifuged. The total washings and filtrate liquid had a volume of 350 milliliters and on analysis indicated the presence of 1.83% total solids and .554% protein. The yield of precipitated protein was then calculated by difference showing that 72.2% of the protein available in the alkaline protein containing liquid was recovered as an acid curd by this process. This high recovery was permitted by the desirable physical characteristics of the acid curd. The curd was sufficiently dense and manageable so that it could be processed by commercial separators. The overall recovery of protein as acid curd based on available protein in the original vegetable meal was 52.8%.

The following Examples 3 and 4 demonstrate the advantages of the present improvement for isolating protein as compared with the hydrolysis method using enzymes.

EXAMPLE 3

*Isolation of Protein From Vegetable Meal by Alkaline Hydrolysis-Enzyme Process*

A 20 gram sample of milled, sieved, straight screw pressed, cotton seed meal was slurried in 180 milliliters of distilled water. The meal had passed a 42 mesh screen and had a protein content of 48.8%.

.2 milliliter of 19% sodium hydroxide solution was added to the slurry to adjust the pH of the slurry to 7. Bromelin was then added at the rate of .2% in relation to the protein substrate. 3.9 milliliters of a .5% aqueous bromelin solution (.0195 gram of dry bromelin) was added altogether.

The slurry was heated to 85° F. and incubated for two hours at this temperature. After this period 1.5 milliliters of 19% sodium hydroxide solution was added to the slurrry to give a final pH of about 10. The slurry was then heated to 160° F. and held 30 minutes at this temperature to bring the available substrate into solution.

The slurry was then centrifuged to separate the insoluble material from the liquid. The remaining insoluble material was then washed with 120 milliliters of hot alkaline water (1 milliliter of 19% sodium hydroxide per liter of distilled water) was held for 15 minutes at 160° F. with occasional stirring. The washed insoluble material was then centrifuged as before.

The resultant combined liquids had a pH of 9.9. The total volume of the solution was 258 milliliters. Analysis of the solution indicated the presence of 2.13% protein and 3.89% total solids. Calculation showed that 56.4% of the protein was extracted from the cotton seed meal by this method. This represents a substantial increase over the straight alkaline hydrolysis method of Example 1. The protein containing liquid was a very dark blackish-brown color.

245 milliliters of the resultant solution was heated to 75° F. and the protein precipitated from the solution by the addition of 3.1% hydrochloric acid solution with good mixing until a pH of 4.5 was reached. The resultant mixture was then centrifuged and the precipitated protein washed twice, each time with 50 milliliter portions of acidified wash water (pH 4.5) and recentrifuged. The total volume of liquid including wash waters was 314 milliliters. The combined liquids had a protein content of .670%. Calculation shows that the overall protein recovery by this method was 33.8%. The protein curd sample was a dark grayish-brown color.

EXAMPLE 4

*Isolation of Protein from Vegetable Meal by the Improved Alkaline Hydrolysis-Enzyme Process*

A 20 gram sample identical to that in Example 3 was slurried in 180 milliliters of distilled water. 1.6 milliliters of 19% sodium hydroxide solution was added. The slurry was then heated to 190° F. and 3 milliliters of 130 volume hydrogen peroxide was added with agitation. The slurry was held at 190° F. for 30 minutes until the peroxide action was completed as evidenced by subsidence of the foam. The slurry was then cooled to 85° F. and distilled water added to readjust to the original volume. The pH of the slurry was 7.32. A .5% bromelin aqueous solution was added at the rate of .2% bromelin in relation to the protein substrate solids. Altogether, 3.9 milliliters of bromelin (.0195 gram) was added. The slurry was then incubated at 85° F. for 2 hours.

After the incubation period 1.6 milliliters of 19% sodium peroxide solution was added to the slurry to give a final pH of 10. The slurry was then heated to 160° F. and held 30 minutes at this temperature to bring the available protein substrate into solution.

The slurry was then centrifuged to separate the soluble material from the liquid. The remaining insoluble material was then washed with 120 milliliters of hot alkaline water (1 milliliter of 19% sodium hydroxide per liter of distilled water) and held at 160° F. for 15 minutes with occasional stirring. The washed insoluble material was then recentrifuged as before.

The resultant combined liquids had a pH of 9.3. The total volumes of the solutions was 277 milliliters. Analysis of the solution indicated the presence of 2.28% protein and 4.34% total solids. Calculation shows that 64% of the protein was extracted from the cotton seed meal by this method. This represents a 9.3% increase over the method of Example 3 which does not employ the improvement of this invention. In addition, the color of the protein containing liquid was a light cream and the insoluble residue had also been considerably lightened.

264 milliliters of the resultant alkaline solution was heated to 75° F. and the protein precipitated from the solution by the addition of 3.1% hydrochloric acid until a pH of 3.8 was reached. The mixture was then centrifuged and the precipitated protein washed twice, each time with 50 milliliter portions of acidified water (pH 4.5) and recentrifuged.

The total liquid including wash water was 381 milliliters. Analysis showed a protein content of .467%. The yield of precipitated protein was then calculated by difference.

The overall protein recovery by this method was 45.4%. This represents an 11.6% increase over the enzyme method without benefit of the present improvement. In addition, the protein sample had a very desirable light cream color.

A series of experiments were conducted to further demonstrate the applicability of the present invention to other vegetable meals (safflower meal in particular) and to demonstrate the operability of the improvement over a wide range of concentrations of hydrogen peroxide. All of these experiments were conducted using the preferred and more desirable enzyme methods. The procedure followed in gathering the data presented in Table 1 below was substantially identical to that described in Example 3 for the prior art enzyme process and to Example 4 for the process employing hydrogen peroxide in accordance with the present invention.

TABLE I.—RECOVERY OF PROTEIN FROM VEGETABLE MEAL WITH AND WITHOUT THE PRESENT IMPROVEMENT

| Type of Meal Used [1] | Ml. of (100 volume) 30% Hydrogen Peroxide per 100 Grams of Meal | Ml. (130 volume) 35% Hydrogen Peroxide per 100 Grams of Meal | Percent Recovery of Protein Extraction Phase |
|---|---|---|---|
| Cottonseed, screw press, high temperature process unground | 0 | | 66.2 |
| Do | 0 | | 69.4 |
| Do | 40 | | 75.3 |
| Do | 60 | | 78.3 |
| Cottonseed, pre-press hexane extracted, low temperature process, milled | | 33.7 | 88.3 |
| Do | | 0 | 70.8 |
| Do | | 30 | 94.2 |
| | | 17 | 70.6 |
| Safflower meal, unground | | 33.5 | 70.6 |
| Do | | 6.25 | 64.8 |

[1] High temperature processing indicates denaturization of the protein and usually a lesser improvement in yields as compared to low temperature processing. Therefore, a correlation of the yield figures between different source materials is not present.

What is claimed is:

1. In the method for separating protein from a vegetable meal by heating the meal in an alkaline aqueous slurry so as to solubilize a substantial portion of the protein and then recovering the same, the combination therewith of treating said meal with hydrogen peroxide in the ratio of about .01 to .4 mole of hydrogen peroxide to 100 grams of said meal at about 150–200° F. prior to recovering the solubilized protein.

2. In the method for separating protein from a vegetable meal by heating the meal in an aqueous slurry in the presence of a proteolytic enzyme and by heating the meal in an alkaline aqueous slurry, said steps solubilizing a substantial portion of the protein in said meal, and then recovering the protein, the combination therewith of heating said meal with hydrogen peroxide in the ratio of about .01 to about .4 mole of hydrogen peroxide to 100 grams of said meal at about 150–200° F. prior to recovering the solubilized protein.

3. In the method for separating protein from vegetable meal derived from seeds selected from the group consisting of cotton, sesame, soy, rape, wheat bran, safflower and coconut by heating the meal at less than about 200° F. in an aqueous slurry at a pH of about 9–12 so as to solubilize the protein, and then recovering the same, the improvement which consists of heating said meal at about 150°–200° F. in the presence of hydrogen peroxide prior to recovering the solubilized protein and wherein the hydrogen peroxide is present in a ratio of about .01 to about .4 mole for each 100 grams of meal.

4. In the method for separating protein from a vegetable meal derived from seeds selected from the group consisting of cotton, sesame, soy, rape, wheat bran, safflower and coconut by heating the meal at about 60–100° F. in an aqueous slurry having a pH of about 4–9 in the presence of a proteolytic enzyme selected from the group consisting of bromelin, papain and ficin, and by heating the aqueous slurry at less than 200° F. at a pH of about 9–12 so as to solubilize the protein, and then recovering the same, the improvement which consists of heating said meal at about 150–200° F. in the presence of hydrogen peroxide prior to recovering the solubilized protein and wherein the hydrogen peroxide is present in the ratio of about .01 to about .4 mole to each 100 grams of meal.

References Cited in the file of this patent

UNITED STATES PATENTS

| 750,048 | Brooks | Jan. 19, 1904 |
| 2,127,843 | Iddings | Aug. 23, 1938 |
| 2,217,264 | Weizmann | Oct. 8, 1940 |
| 2,757,171 | Mozingo | July 31, 1956 |

FOREIGN PATENTS

| 18,936 | Great Britain | of 1900 |
| 598,641 | Great Britain | Feb. 23, 1948 |